United States Patent [19]

Bertsch

[11] Patent Number: 4,550,571
[45] Date of Patent: Nov. 5, 1985

[54] BALANCED INTEGRAL STIRLING CRYOGENIC REFRIGERATOR

[75] Inventor: Peter K. Bertsch, Harvard, Mass.

[73] Assignee: Helix Technology Corporation, Waltham, Mass.

[21] Appl. No.: 566,212

[22] Filed: Dec. 28, 1983

[51] Int. Cl.[4] .............................................. F25B 9/00
[52] U.S. Cl. ................................................ 62/6; 60/517;
74/570; 92/140; 123/197 AB; 123/197 AC
[58] Field of Search .................... 62/6; 92/140; 74/49,
74/55, 570; 123/197 AB, 197 AC; 60/517

[56] References Cited

U.S. PATENT DOCUMENTS

| | | | |
|---|---|---|---|
| 3,440,933 | 4/1969 | Sutton | 92/140 |
| 4,004,421 | 1/1977 | Cowans | 60/517 |
| 4,236,416 | 12/1980 | Barcita | 74/570 |
| 4,248,050 | 2/1981 | Durenec | 62/6 |
| 4,365,982 | 12/1982 | Durenec | 62/6 |
| 4,382,362 | 5/1983 | Mortel et al. | 60/517 |

OTHER PUBLICATIONS

Final Technical Report for Low Vibration Cooler, Report No. EOSR411 by G. Shepherd, Jun. 25, 1979.

Primary Examiner—Ronald C. Capossela
Attorney, Agent, or Firm—Hamilton, Brook, Smith & Reynolds

[57] ABSTRACT

In an integral Stirling cryogenic refrigerator the compressor piston is several times heavier than the displacer. In order to counterbalance both the displacer and compressor piston with a rotating counterweight, the displacer connecting rod is formed of a high density material. Specifically, the connecting rod is formed of a tungsten alloy and is several times heavier than the displacer.

12 Claims, 7 Drawing Figures

BALANCED INTEGRAL STIRLING CRYOGENIC REFRIGERATOR

DESCRIPTION

1. Technical Field

This invention relates to cryogenic refrigerators and in particular to integral Stirling cycle refrigerators. It also has application to other refrigerators such as integral Vuilleumier cycle refrigerators.

2. Background

Typical cryogenic refrigerators operating on the Stirling cycle include a reciprocating compressor piston which causes a near sinusoidal pressure variation in a working volume of gas. The gas is usually helium. The working volume of gas includes gas within a cold finger in which a gas displacer reciprocates. As the displacer reciprocates, it forces the refrigerant gas through a thermal regenerator which is generally carried within the displacer.

By positioning the compressor and displacer along axes which are angled 90 degrees relative to each other and by driving the two elements by a common crank shaft, the compressor and displacer can be harmonically driven 90 degrees out of phase. This phase relationship allows the gas to be compressed by the compressor piston while the displacer dwells near the cold end of the cold finger. Then, the compressor dwells while the displacer is moved toward the warm end of the refrigerator. Gas is displaced through the displacer and is cooled by heat transfer to the regenerative matrix. Next, the displacer dwells near the warm end of the cold finger while the gas in the working volume is expanded by the compressor piston movement. The expansion of the gas in the cold end of the cold finger produces useful refrigeration to maintain a substantial temperature gradient over the length of the regenerator. Finally, to complete the cycle, the compressor piston dwells while the displacer returns to the cold end of the refrigerator. Cold gas is displaced through the regenerative matrix and heat is transferred from the matrix to the gas.

One problem encountered in integral Stirling refrigerators is the harmonic vibration resulting from the rotating eccentric which drives the compressor piston and displacer and from the reciprocation of the compressor piston and the displacer. A substantial amount of that vibration has been eliminated by providing a counterweight on the drive shaft as discussed in a Final Technical Report for Low Vibration Cooler, report number EOSR411, by G. Shepherd, June 25, 1979. According to the report, by providing equal mass to the compressor piston and displacer, driving the two elements 90 degrees out of phase and driving the two elements with equal stroke, the reciprocating weights of the compressor and displacer and the rotating weight of the eccentric can be balanced by a counterweight having a center of gravity 180 degrees from the eccentric center. The approach suggested by the Shepherd report was utilized in U.S. Pat. No. 4,365,982 to Durenec.

In the particular integral Stirling refrigerator which is the subject of this invention, the diameter of the compressor is substantially greater than the displacer diameter. As a result, the weight of the displacer is less then one-fourth of the weight of the compressor piston. Due to size limitations and material requirements in the displacer, it is not feasible to enlarge or add sufficient weight to the displacer in order to meet the requirement that the piston and displacer masses be about equal for counterbalancing as described by Shepherd. An object of this invention is to counterbalance the reciprocating compressor piston and displacer masses where the compressor piston mass is substantially greater than the displacer mass.

SUMMARY OF THE INVENTION

The counterbalancing approach suggested in the Shepherd report was based on a recognition that the masses of the intermediate sections of the connecting rods to the compressor piston and displacer were low compared to rotating and reciprocating masses in the system. The connecting rods themselves have a wobbling motion. Based on that recognition, the balance analysis was completed with an assumption that the motion of each connecting rod included a rotating motion at one end and a reciprocating motion at the other end, and the motion of the center could be ignored.

Contrary to the Shepherd report, it has been determined that to reduce vibrations in the first harmonic it is acceptable that the displacer connecting rod be of very substantial mass. The connecting rod performs essentially as a reciprocating mass, and the weight of the connecting rod can be added to the weight of the displacer. Further, where the weight of the compressor piston is several times greater than the weight of the displacer, a high density material can be used to form the connecting rod to make up the difference in masses reciprocating along each axis. For example, conventional connecting rods are formed of aluminum which has a density of about 3 grams per cubic centimeter; a tungsten or tungsten alloy having mechanical properties suitable for use as a connecting rod may have a density of 17 grams per cubic centimeter.

Thus, in accordance with the present invention, the connecting rod to the light displacer comprises, and is preferably formed from, a high density material of at least about 15 grams such that the connecting rod is heavier than the displacer alone. Such a heavy connecting rod provides the required reciprocating mass to match the reciprocating mass of the compressor piston, and the wobbling of such a heavy mass does not result in a significant undesirable vibration. The connecting rod can be more than three times the weight of the displacer.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DESCRIPTION OF A PREFERRED EMBODIMENT

Figure 1:
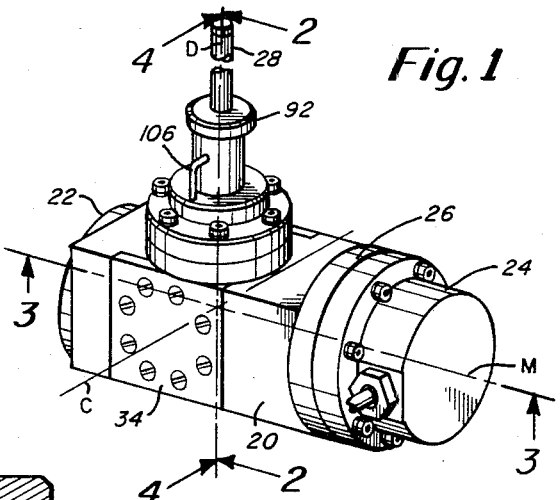
FIG. 1 is a perspective view of an integral Stirling system embodying the present invention.
Figure 2:
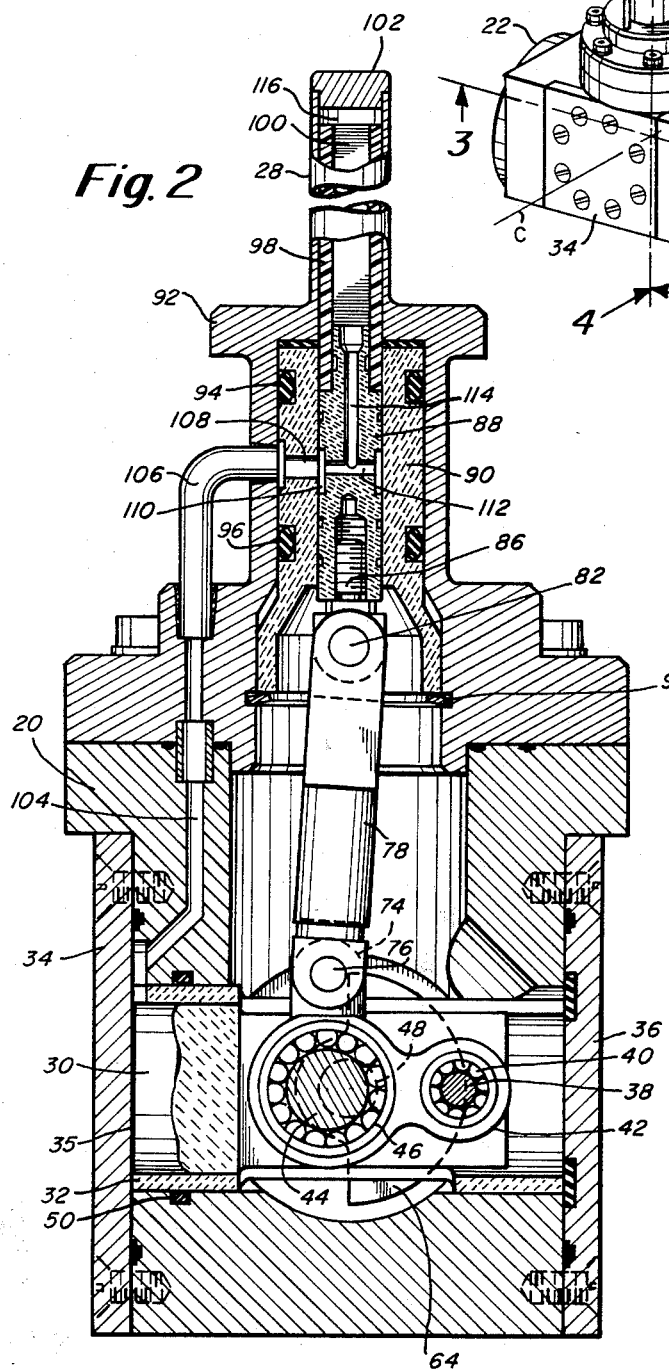
FIG. 2 is a cross sectional view of the integral Stirling refrigerator of FIG. 1 taken along the plane D-C to show the displacer and compressor piston along axes angled 90 degrees.
Figure 3:
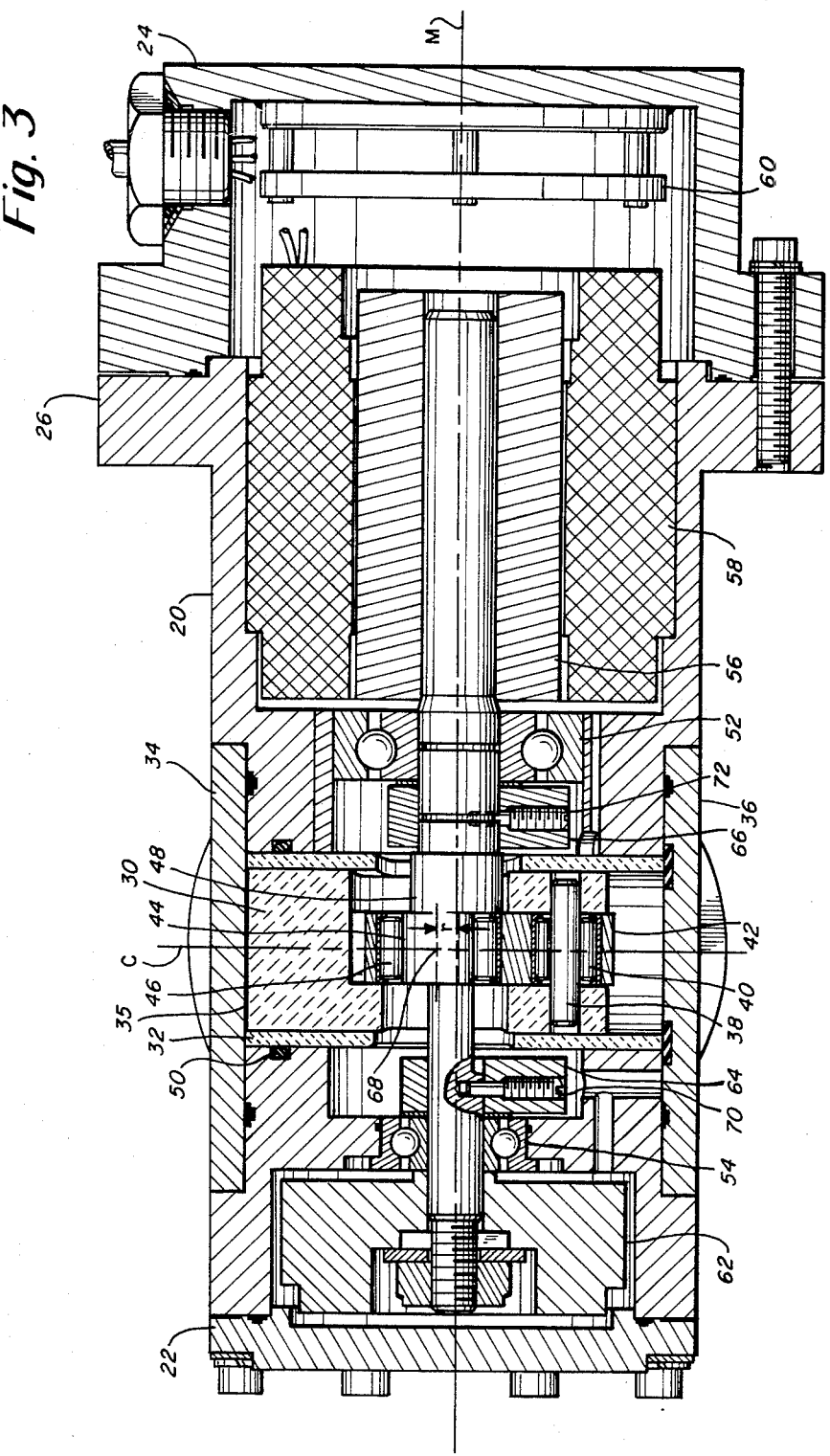
FIG. 3 is a longitudinal cross section of the refrigerator of FIG. 1 taken along the plane C-M to show the motor and compressor in cross section.
Figure 4:
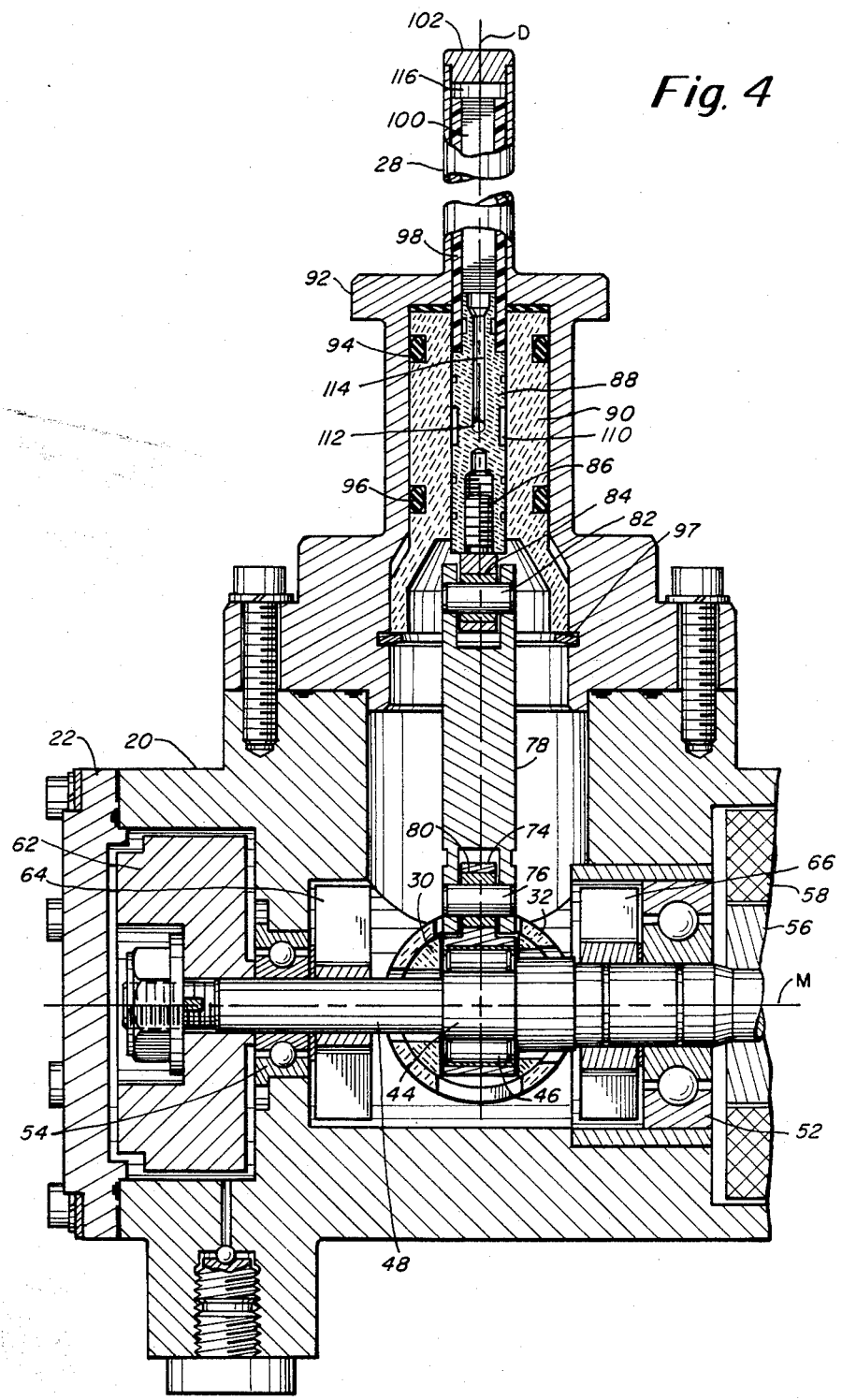
FIG. 4 is a longitudinal cross section of the displacer of the refrigerator in FIG. 1 taken along the plane D-M.

The integral Stirling refrigerator shown in FIG. 1 includes a motor and compressor housing 20 which is closed at the compressor end by an end plate 22 and at the motor end by a cap 24 joined to a flange 26. As can be seen in FIGS. 2-4, the motor within the housing rotates about a motor axis M and the compressor piston reciprocates along a compressor axis C. A cold finger 28 extends from the side of the compressor/motor housing. As shown in FIG. 4, the cold finger houses a displacer which reciprocates along the axis D.

As shown in FIGS. 2 and 3, a cermet compressor piston 30 reciprocates within a cermet sleeve 32 and a clearance seal is formed therebetween. The sleeve extends across the compressor motor housing 20 between closure plates 34 and 36. It is held from the housing 20 by an O-ring 50 in order that it can float to prevent binding of the compressor piston and the sleeve.

The head space 35 to the compressor, which is part of the working volume of gas, is between the compressor piston and the closure plate 34. A port 104 (FIG. 2) is formed in the housing 20 to form a gas line between the head space and a tube 106.

The compressor piston 30 is driven by a wrist pin 38 which is interference fit into the lower end of the piston as viewed in FIG. 3. The wrist pin in turn extends through a bearing 40 positioned in an arm 42. The arm 42 is mounted to an eccentric 44 through a bearing 46. The eccentric is mounted to a drive shaft 48. Both the compressor piston 30 and the piston sleeve 36 are slotted in order that the drive shaft 48 can extend therethrough without interfering with the compressor piston through its full stroke. As the drive shaft rotates, the eccentric follows a circular path having a radius r and drives the arm 42 and piston 30 in a harmonic motion. In FIG. 3, the piston is shown at top dead center of its stroke.

As shown in FIG. 3, the drive shaft 48 rides in two sets of ball bearings 52 and 54. The drive shaft is driven by an electric motor which includes a permanent magnet 56 driven by a stator coil 58. The coil and magnet rotor form a brushless DC motor driven by electronics 60.

Figure 5:
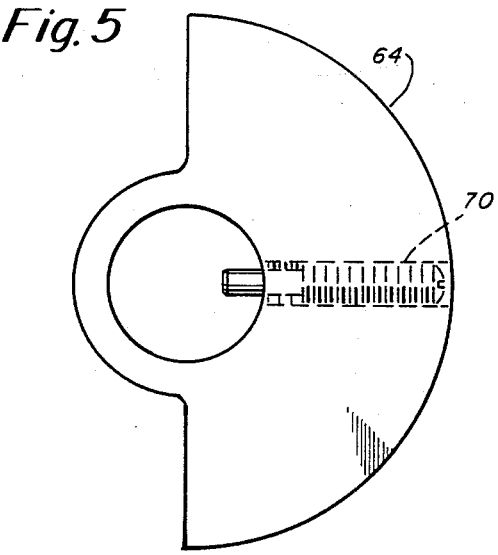
FIG. 5 is a side view of one of the counterweights used in the system of FIGS. 1-4.

A flywheel 62 is mounted at the opposite end of the drive shaft. Two counterbalancing masses 64 and 66, one of which is shown in FIG. 5, are mounted to the drive shaft at opposite sides of the compressor sleeve. Each counterweight is keyed to the drive shaft 180 degrees from the eccentric center 68 by set screws 70 and 72.

The displacer assembly is shown in FIGS. 2 and 4. A displacer drive arm 74 is mounted to the eccentric 44 through the bearing 46 along with the compressor piston arm 42. It can be seen in FIG. 4 that the compressor piston sleeve 32 is slotted to allow the arm 74 to extend therethrough at right angles to the drive shaft 48. A pin 76 fixed to a displacer connecting rod 78 rides in a bearing 80 on the arm 74. A pin 82, fixed to the opposite end of the connecting rod 78, is positioned in a bearing 84. The bearing 84 is carried by an axial pin 86 screwthreaded to the displacer piston element 88. The piston element 88 is made of cermet and a clearance seal is formed between the piston 88 and a surrounding cermet bushing 90. The cermet bushing 90 floats within the housing 92 due to two O-rings seals 94 and 96, and it is retained within the displacer housing 92 by a retaining ring 97.

A plastic cylinder 98 is fixed to the displacer piston 88 and extends into the cold finger cylinder 28. A regenerative matrix 100 is carried within the cylinder 98. The cold finger 28 is closed by a high conductivity end cap 102 which serves as the refrigerator cold plate.

A port 104 in the compressor motor housing 20 is in communication with the head space of the compressor (not shown in FIG. 4). That port is connected to the displacer assembly through a tube 106 which communicates with a port 108 through the displacer piston bushing 90. Through the full stroke of the piston, port 108 is in communication with a groove 110 formed in the displacer piston. Additional ports 112 and 114 extend through the displacer piston so that the working fluid from the compressor head space ultimately communicates with the regenerative matrix 100 and the expansion space 116.

Figure 6:
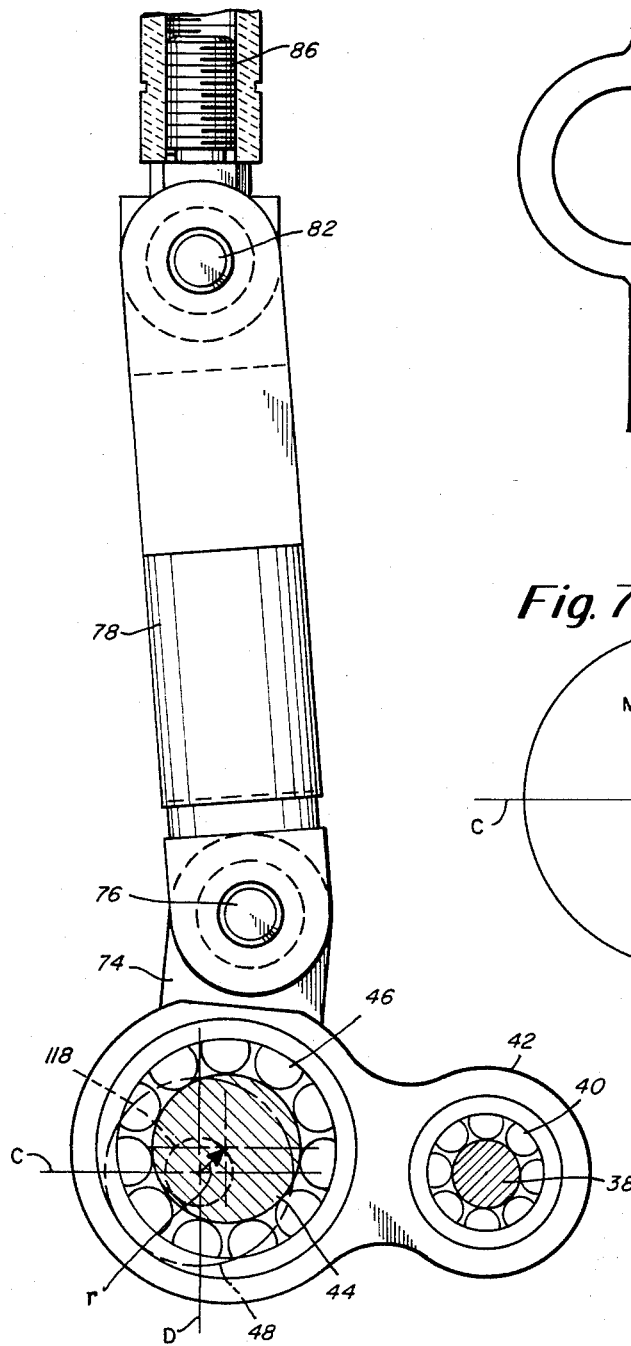
FIG. 6 is an enlarged view of the eccentric, the compressor piston and displacer connecting arms and the displacer connecting rod.

The relationship of the eccentric 44 to the drive shaft 48 can be best seen in the end view of FIG. 6 which shows the compressor and displacer drive arms 42 and 74 and the connecting rod 78 enlarged. The eccentric center is displaced a short distance r from the center of the drive shaft 48. The eccentric center follows a circular path 118 as the drive shaft 48 is rotated. With rotation of the eccentric about that circle 118, the wrist pins 38 and 82, and thus the compressor piston and displacer, follow harmonic reciprocating motions along respective axes C and D.

Figure 7:
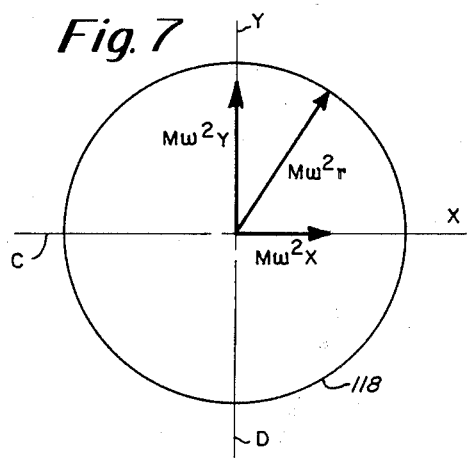
FIG. 7 is a vector diagram of the forces due to the reciprocating masses superimposed on the enlarged eccentric circle from FIG. 6.

The circle 118 is shown enlarged in FIG. 7. Superimposed over the circle are the force vectors due to acceleration of the compressor piston and displacer. In the Shepherd report, it was suggested that the compressor piston and displacer be of equal mass M. Therefore, the respective forces on the drive shaft due to acceleration of the compressor piston and displacer are $M\omega^2 X$ and $M\omega^2 Y$. It can be seen in FIG. 7 that the vector sum of those forces is a radial force $M\omega^2 r$ where r is the radius of the eccentric. Shepherd recognized that, by providing a compressor piston and a displacer of equal masses along axes angled at 90 degrees, the vector sum is a radial force which can be balanced by a radial force in the opposite direction. Such a radial force can be the centrifugal force due to a counterweight whose center of gravity is also eccentric to the drive shaft. The counterweight, which must also balance the eccentric mass, should be positioned 180 degrees from the drive eccentric. If the mass of the counterweight is equal to the mass of each of the displacer and compressor piston, plus the mass of the eccentric itself, its center of gravity should be positioned at the radius r.

The Shepherd design was based on an assumption that the connecting rod has a relatively small mass and can be considered to be distinct rotating and reciprocating masses at each end thereof. It has been determined, however, that a relatively very heavy connecting rod 78 can be used to provide a portion of the mass M without introducing excessive undesirable vibration. Even where the displacer must, due to other design requirements, be much lighter than the compressor piston, the mass M of the displacer assembly can be made about the same as that of the compressor piston assembly by providing a very heavy connecting rod 78. The wobbling, heavy connecting rod only introduces second harmonic vibrations which are not substantial.

In the present invention, that heavy connecting rod is provided by forming the rod of a tungsten alloy which has a density of 17 grams per cubic centimeter. Tungsten is particularly desirable for use in the connecting rod because it has a density of greater than 15 grams per centimeter, is machinable and has the strength required for a driving element.

In a specific embodiment, the compressor piston is about 22 grams and the displacer is only about 4 grams. By using a heavy tungsten connecting rod which is 18 grams, the total weight of the displacer assembly can be made to match the weight of the compressor piston.

While the invention has been particularly shown and described with reference to a preferred embodiment thereof, it will be understood by those skilled in the art that various changes in form and details may be made therein without departing from the spirit and scope of the invention as defined by the appended claims. For example, the eccentric could be a crank rather than a cam.

I claim:

1. A cryogenic refrigerator comprising a rotary drive shaft, a reciprocating compressor piston assembly including a compressor piston driven along a first axis by the drive shaft through a drive eccentric, a reciprocating displacer driven along a second axis, angled about 90 degrees from the first axis, by the drive shaft through said drive eccentric and a displacer connecting rod, and an eccentric counterweight mounted to the drive shaft with a center of gravity about 180 degrees about the drive shaft from the drive eccentric center, the displacer connecting rod having a pivotal connection to each of the displacer and the drive eccentric such that it has a wobbling motion as it drives the displacer, wherein the weight of the compressor piston is substantially greater than the weight of the displacer, the displacer connecting rod comprises high density material such that the weight of the connecting rod is greater than the weight of the displacer, the combined weight of the displacer and connecting rod is about the same as the weight of the compressor piston assembly, and the weight of the counterweight is such that it substantially balances the rotating drive eccentric and the reciprocating compressor piston assembly, displacer connecting rod and displacer in the first harmonic.

2. A cryogenic refrigerator as claimed in claim 1 wherein the density of said high density material in the connecting rod is at least about 15 grams per cubic centimeter.

3. A cryogenic refrigerator as claimed in claim 2 wherein said high density material in the connecting rod is tungsten or a tungsten alloy.

4. A cryogenic refrigerator as claimed in claim 1 wherein the weight of the connecting rod is at least three times the weight of the displacer.

5. A cryogenic refrigerator as claimed in claim 1 wherein the connecting rod is primarily comprised of and formed from a high density material having a density of at least about 15 grams per cubic centimeter.

6. A cryogenic refrigerator as claimed in claim 5 wherein said high density material in the connecting rod is tungsten or a tungsten alloy.

7. A cryogenic refrigerator comprising a rotary drive shaft, a reciprocating compressor piston assembly including a compressor piston driven along a first axis by the drive shaft through an eccentric, a reciprocating displacer driven along a second axis, angled from the first axis, by the drive shaft through an eccentric and a displacer connecting rod, the displacer connecting rod having a pivotal connection to each of the displacer and the drive eccentric such that it has a wobbling motion as it drives the displacer wherein the weight of the compressor piston is substantially greater than the weight of the displacer, the displacer connecting rod comprises high density material such that the weight of the connecting rod is greater than the weight of the displacer, the combined weight of the displacer and connecting rod is about the same as the weight of the compressor piston assembly, and the weights driven by the drive shaft are counterbalanced in the first harmonic.

8. A cryogenic refrigerator as claimed in claim 7 wherein the density of said high density material in the connecting rod is at least about 15 grams per cubic centimeter.

9. A cryogenic refrigerator as claimed in claim 8 wherein said high density material in the connecting rod is tungsten or a tungsten alloy.

10. A cryogenic refrigerator as claimed in claim 7 wherein the weight of the connected rod is at least three times the weight of the displacer.

11. A cryogenic refrigerator as claimed in claim 7 wherein the connecting rod is primarily comprised of and formed from a high density material having a density of at least about 15 grams per cubic centimeter.

12. A cryogenic refrigerator as claimed in claim 11 wherein said high density material in the connecting rod is tungsten or a tungsten alloy.

* * * * *